Jan. 27, 1931. G. W. WILDIN 1,790,190
HOSE COUPLING
Filed Jan. 26, 1926
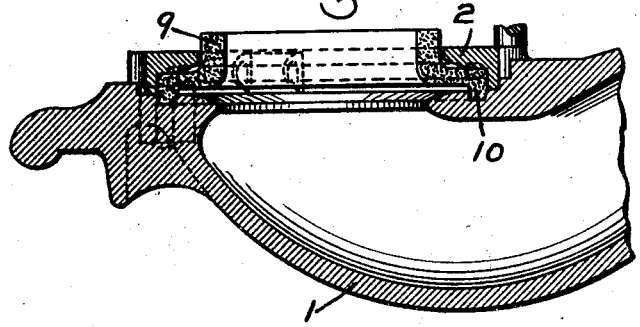
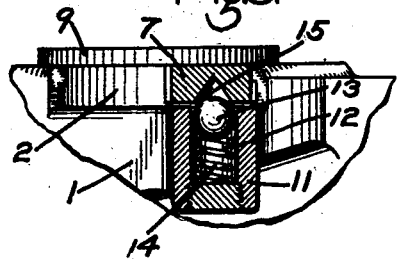
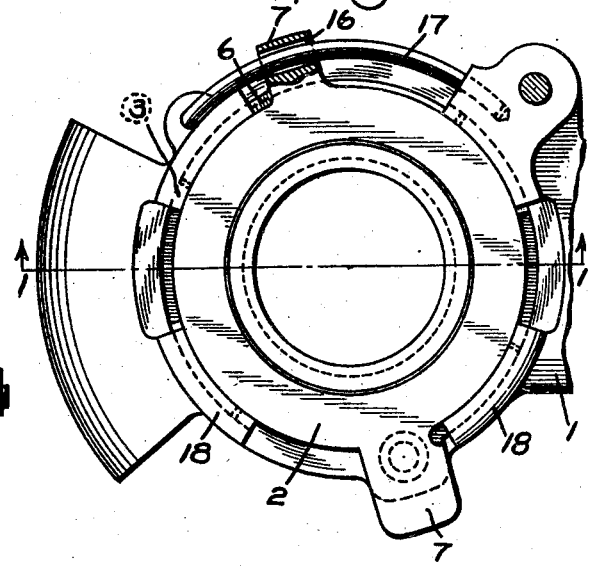
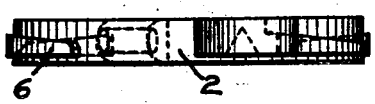
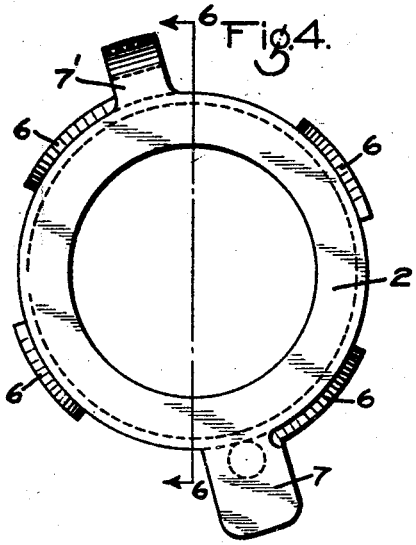
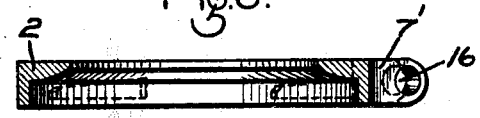
INVENTOR
GEORGE W. WILDIN
BY *Wm. M. Cady*
ATTORNEY Patented Jan. 27, 1931

1,790,190

UNITED STATES PATENT OFFICE

GEORGE W. WILDIN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

HOSE COUPLING

Application filed January 26, 1926. Serial No. 83,793.

This invention relates to hose couplings of the well known type adapted to be operated by hand for coupling up the ends of flexible hose connections between cars of a train.

The present invention has particular reference to means for holding the coupling gasket of the hose coupling in place and is in the nature of an improvement on the construction covered by my prior pending application, Serial No. 23,999, filed April 18, 1925.

In the accompanying drawing; Fig. 1 is a section on the line 1—1 of Fig. 2, of a coupling head embodying my improvement; Fig. 2 a face view of the coupling head; Fig. 3 a detail sectional view of the clamping ring locking means; Fig. 4 a plan view of the clamping ring; Fig. 5 a side view of the clamping ring; and Fig. 6 a section on the line 6—6 of Fig. 4.

According to the construction shown in the drawing, the face of the hose coupling head 1 is bored out so as to receive a gasket clamping ring 2 which is adapted to engage flexible rubber gasket 9.

The clamping ring 2 is provided with four wedge shaped lips 6 disposed at the periphery of the ring and adapted to engage in an undercut annular groove 3 of the coupling head. Carried by the ring 2 at diametrically opposite points are tangs 7 and 7'.

The tang 7' is provided with a bore 16 adapted to receive a rod 17 formed as an arc of a circle and having its ends secured to the coupling head 1.

The coupling head flange 18 is cut away at four places, down to the bottom of the groove 3, so that the wedge lips 6 of the ring 2 may be applied to the coupling head.

When a gasket 9 is to be applied to the coupling head, the clamping ring 2 is thrown back out of the way, the rod 17 serving to retain the ring in association with the coupling head, so that the ring cannot be mislaid. The gasket 9 having been placed in position, the ring 2 is applied over the gasket, with the lips 6 registering with the cutaway portions of the coupling head.

The ring is then rotated in a counter-clockwise direction to the position shown in Fig. 2 and in this movement, the lips 6 are caused to engage in the groove 3, so that the wedge lips act to clamp the gasket securely in position.

In order to lock the ring 2 in its clamping position, the coupling head is provided with a lug 11 having a bore 12 containing a ball 13 which is pressed outwardly by a spring 14. The ball 13 is adapted to engage a recess 15 provided in the tang 7 when the ring 2 has been turned to its clamping position, to thereby yieldingly lock the ring in said position.

Having four uniformly spaced wedging lips 6, the ring 2 acts to apply clamping pressure more evenly on the gasket and the clamping ring cannot be lost or mislaid, since it is held to the coupling head when not in its clamping position, by the rod 17.

Having now described my invention, what I claim as new and desire to secure by Letters Patent, is:—

1. The combination with a hose coupling head having a seating face for a gasket, of a gasket mounted on said face, a rotatable clamping ring for clamping said gasket on said face, an arcuate member carried by said head, a tang carried by said ring and having a bore through which said member extends.

2. The combination with a hose coupling head having a seating face for a gasket, of a gasket mounted on said face, a clamping member for clamping said gasket on said face, and a rod secured to said head on which said member is slidably mounted for longitudinal movement on said rod, to permit rotative movement of said member on said rod and also a swinging movement of said member on said rod.

In testimony whereof I have hereunto set my hand.

GEORGE W. WILDIN.